US008686867B2

(12) United States Patent
Liao et al.

(10) Patent No.: US 8,686,867 B2
(45) Date of Patent: Apr. 1, 2014

(54) ABNORMAL DISCHARGE ALARM DEVICE FOR STEAM TRAP

(75) Inventors: Jung-Huang Liao, Zhubei (TW); I-Te Huang, Hsinchu (TW); Jing-Lyang Jeng, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 718 days.

(21) Appl. No.: 12/778,614

(22) Filed: May 12, 2010

(65) Prior Publication Data

US 2011/0234418 A1     Sep. 29, 2011

(30) Foreign Application Priority Data

Mar. 26, 2010    (TW) ................................ 99109259 A

(51) Int. Cl.
| | |
|---|---|
| G08B 21/00 | (2006.01) |
| G01F 19/00 | (2006.01) |
| G01F 17/00 | (2006.01) |

(52) U.S. Cl.
USPC ............ 340/679; 340/603; 340/605; 73/1.73; 702/51

(58) Field of Classification Search
None
See application file for complete search history.

(56) References Cited

U.S. PATENT DOCUMENTS

| | | | |
|---|---|---|---|
| 4,213,340 A * | 7/1980 | Cheng .......................... | 73/304 R |
| 6,644,131 B2 | 11/2003 | Rebik | |
| 7,664,610 B2 | 2/2010 | Anderson et al. | |
| 8,050,875 B2 * | 11/2011 | Karschnia ....................... | 702/51 |
| 2004/0195840 A1 | 10/2004 | Baarman et al. | |
| 2008/0150737 A1 | 6/2008 | Karschnia | |

FOREIGN PATENT DOCUMENTS

| | | |
|---|---|---|
| EP | 0972982 B1 | 10/2004 |
| EP | 1114279 B1 | 12/2005 |
| GB | 2457924 A | 9/2009 |
| JP | 2003343794 | 12/2003 |
| JP | 2008230273 | 10/2008 |
| JP | 2008256171 | 10/2008 |
| JP | 2010013955 | 1/2010 |
| TW | I357358 B1 | 2/2012 |

OTHER PUBLICATIONS

Intellectual Property Office, Ministry of Economic Affairs, R.O.C., "Office Action", Aug. 30, 2012, Taiwan.
Japan Patent Office, "Office Action", May 22, 2012, Japan.
Intellectual Property Office, Ministry of Economic Affairs, R.O.C., "Office Action", Feb. 27, 2013, Taiwan.

\* cited by examiner

*Primary Examiner* — Brian Zimmerman
*Assistant Examiner* — Omeed Alizada
(74) *Attorney, Agent, or Firm* — Morris Manning & Martin LLP; Tim Tingkang Xia, Esq.

(57) ABSTRACT

An abnormal discharge alarm device is applied in a steam trap. The steam trap is installed in a pipeline of a steam system. The abnormal discharge alarm device includes a power generation component and a control circuit. The power generation component receives a fluid discharged from the steam trap and generates a self-generated electric power. The control circuit receives and detects the self-generated electric power to obtain a detection result. The control circuit sends an alarm signal when the detection result is greater than a predetermined threshold value. In addition, the abnormal discharge alarm device may further include a monitoring unit. The control circuit transmits the detection result to the monitoring unit. The monitoring unit obtains an updated threshold value according to accumulated detection results, and determines whether to send an alarm after comparing the updated threshold value with a real-time detection result.

8 Claims, 7 Drawing Sheets

ABNORMAL DISCHARGE ALARM DEVICE FOR STEAM TRAP

CROSS-REFERENCE TO RELATED APPLICATIONS

This non-provisional application claims priority under 35 U.S.C. §119(a) on Patent Application No(s). 099109259 filed in Taiwan, R.O.C. on Mar. 26, 2010, the entire contents of which are hereby incorporated by reference.

BACKGROUND

1. Field

The present invention relates to an abnormal discharge alarm device, and more particularly to a device capable of generating an abnormal discharge alarm without requiring supply of power.

2. Related Art

A steam trap is applied in a steam system. During operation of the steam system, steam, condensate water, and gas usually exist in a pipeline. Major functions of the steam trap are to (a) prevent the steam from leaking from the pipeline, (b) remove condensate water of the system, and (c) discharge uncondensable gas. If the steam trap used is not suitable for the steam system or is in abnormal operation, serious consequences such as water hammer, ineffective heat transfer, steam leakage and system corrosion might occur.

After the steam trap is installed in the steam system, the steam trap discharges the condensate water or uncondensable gas with a valve at a suitable time according to a state of the system and prevents undesired steam leakage. Relatively frequent failures of the steam trap include: (a) valve closure failure after drainage, (b) drainage failure due to valve blockage, and (c) steam leakage.

In order to know whether the steam trap operates normally in advance, persons in this art have proposed failure diagnosis technologies, such as UK Patent Application No. GB2457924, published on Sep. 2, 2009, entitled "Steam Trap Monitoring", and U.S. Pat. No. 6,644,131, issued on Nov. 11, 2003, entitled "Steam Trap Instrument Module".

In the former one, a temperature or pressure difference of the steam trap is measured, and failure diagnosis is performed according to the temperature or pressure difference, so as to predict a failure that might occur to the steam trap. In the latter one, a ball float steam trap is disclosed, which includes a pressure sensor, a temperature sensor and an eddy current displacement sensor, and the steam trap is diagnosed using signals returned by the sensors.

Although a current state of the steam trap can be sensed and diagnosis can thus be performed on the steam trap in the prior art, in practical factory applications, due to cost considerations, a maintainer seldom replaces the steam trap according to a prediction that a failure might occur to the steam trap, but usually replaces a failed steam trap when an anomaly occurs to the steam trap. In addition, if it is desired to continuously monitor the state of the steam trap, circuit wiring needs to be provided at all portions in the whole steam system that are arranged with steam traps, and the electric power required for continuous monitoring does not meet the requirements of environmental protection, energy saving, and carbon reduction.

SUMMARY

In view of the above problems, the present invention is an abnormal discharge alarm device for a steam trap, which is capable of generating an electric power by using a discharged fluid, and sending an alarm signal in the event of an abnormal discharge, thereby achieving effects of energy saving and abnormal alarming at the same time.

In an embodiment, the present invention provides an abnormal discharge alarm device for a steam trap, which is applied in a steam trap having a discharge port. The abnormal discharge alarm device comprises a power generation component and a control circuit. The power generation component is connected to the discharge port and receives a fluid discharged from the discharge port. The power generation component generates a self-generated electric power when receiving the fluid. The control circuit has a predetermined threshold value. The control circuit receives and detects the self-generated electric power to obtain a detection result. When the detection result exceeds a predetermined threshold value, the control circuit sends an alarm signal.

In an embodiment, the abnormal discharge alarm device for the steam trap further comprises an alarm element. The alarm element receives the self-generated electric power and sends an alarm when receiving the alarm signal. The alarm may be a light ray or a sound.

In an embodiment, the power generation component comprises a housing, a rotor, and a rectification and voltage regulation circuit. The housing is connected to the discharge port and has a plurality of induction coils. The rotor is pivoted to the housing and rotates by receiving the fluid from the discharge port. The rotor further has a plurality of magnetic elements. The coils cut magnetic lines of force of the magnetic elements to generate an induced electric power when the rotor rotates. The rectification and voltage regulation circuit performs rectification and voltage regulation on the induced electric power to obtain the self-generated electric power.

In another embodiment, the abnormal discharge alarm device for the steam trap further comprises a signal transfer module and a monitoring unit. The signal transfer module receives and transmits the alarm signal. The monitoring unit receives the alarm signal transmitted by the signal transfer module and sends an alarm corresponding to the alarm signal.

In another embodiment, the control circuit transmits the detection result to the monitoring unit through the signal transfer module. The monitoring unit collects and analyzes statistics regarding the detection result to obtain an updated threshold value. The monitoring unit transmits the updated threshold value to the control circuit through the signal transfer module. The control circuit replaces the predetermined threshold value with the received updated threshold value.

In another embodiment, the monitoring unit has a learning mode and a monitoring mode. When the monitoring unit is set to the learning mode, the monitoring unit obtains an intermittent frequency range, a discharge duration range and an upper limit of non-discharge duration according to the collected detection result. When the monitoring unit is set to the monitoring mode, the monitoring unit obtains an intermittent frequency value, a discharge duration, and a non-discharge duration according to the collected detection result. The monitoring unit sends a corresponding abnormal signal when the intermittent frequency value does not fall within the intermittent frequency range, or when the discharge duration does not fall within the discharge duration range, or when the non-discharge duration exceeds the upper limit of non-discharge duration.

Through the power generation component and the control circuit of the abnormal discharge alarm device, the abnormal discharge alarm device can generate a self-generated electric power by using the fluid discharged by the steam trap, the self-generated electric power is supplied to the control circuit, and the control circuit determines whether the discharge is an abnormal discharge according to the detection result, and if yes, sends an alarm. In addition, in another embodiment of the abnormal discharge alarm device, the monitoring unit can collect and analyze the detection result to obtain statistical data and determine whether the steam trap is in a normal operating state more precisely.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
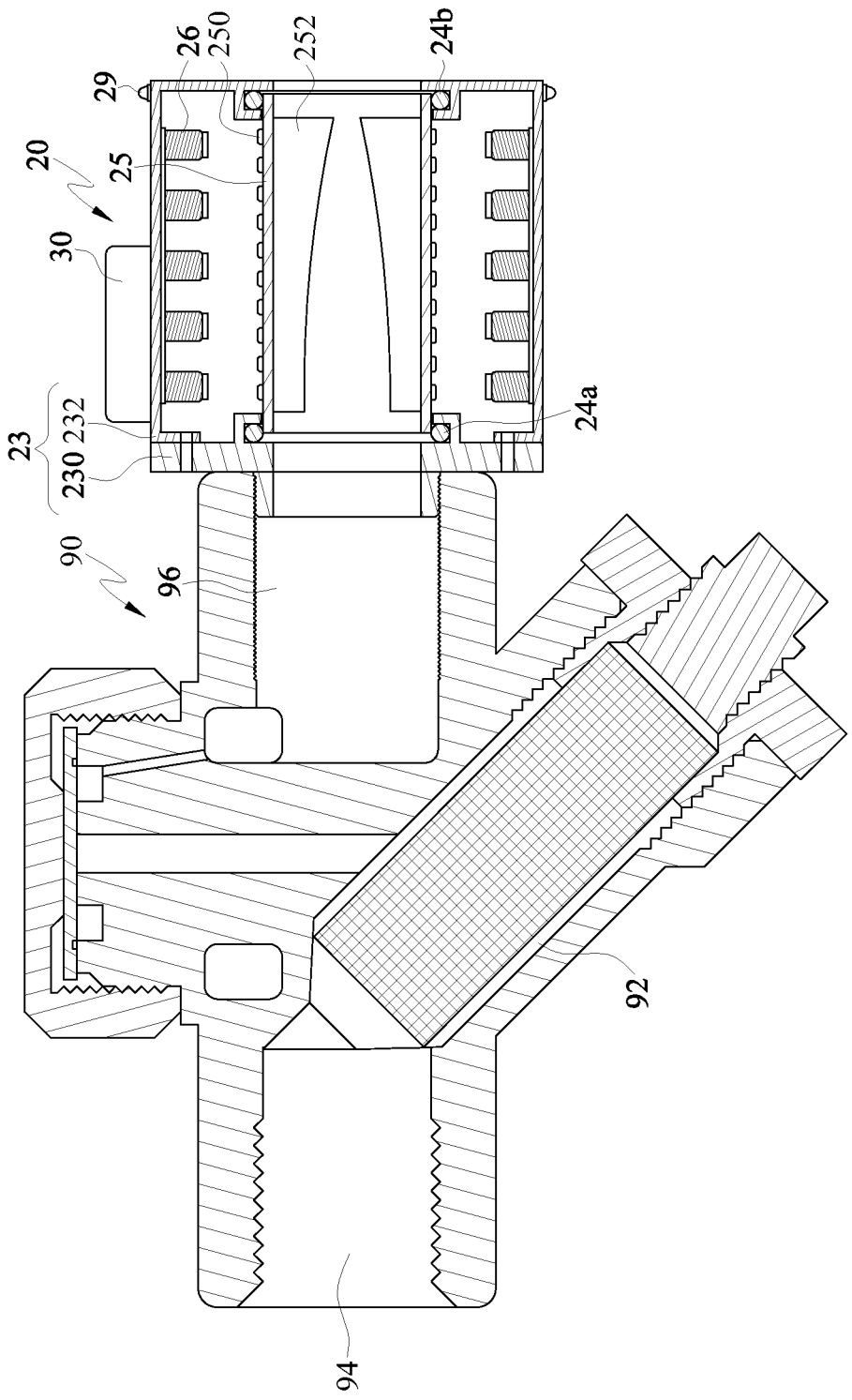
FIG. 1 is a schematic view of a steam trap applying an abnormal discharge alarm device for a steam trap according to a first embodiment of the present invention.

FIG. 1 is a schematic view of a steam trap applying an abnormal discharge alarm device for a steam trap according to a first embodiment of the present invention. As can be seen from FIG. 1, an abnormal discharge alarm device 20 is arranged at a discharge port 96 of a steam trap 90. The steam trap 90 is a disk-type steam trap (or referred to as a thermodynamic steam trap). In addition, the steam trap 90 may also be, but not limited to, a ball float steam trap, an inverted bucket steam trap, or a temperature sensitive steam trap (bi-metallic).

The steam trap 90 has an air inlet 94, a discharge port 96, and a filter 92. The steam trap 90 is arranged in a pipeline of a steam system, receives a fluid from the pipeline through the air inlet 94, and discharges the fluid through the discharge port 96. During normal operation, the steam trap 90 has the following discharge modes: (1) when the temperature of the steam in the pipeline decreases, the steam trap 90 discharges condensed water generated due to the temperature difference through the discharge port 96, and the discharge is generally intermittent; (2) condensate water is sometimes intermittently discharged as flash steam after entering the air instantly; and (3) when uncondensable gas exists in the pipeline, the uncondensable gas is discharged through the discharge port 96 together with the condensate water. Therefore, the fluid discharged through the discharge port 96 may be condensate water, steam, or uncondensable gas. The fluid may be at a high or low pressure, and the discharged fluid may be in a liquid or gaseous state.

Figure 2:
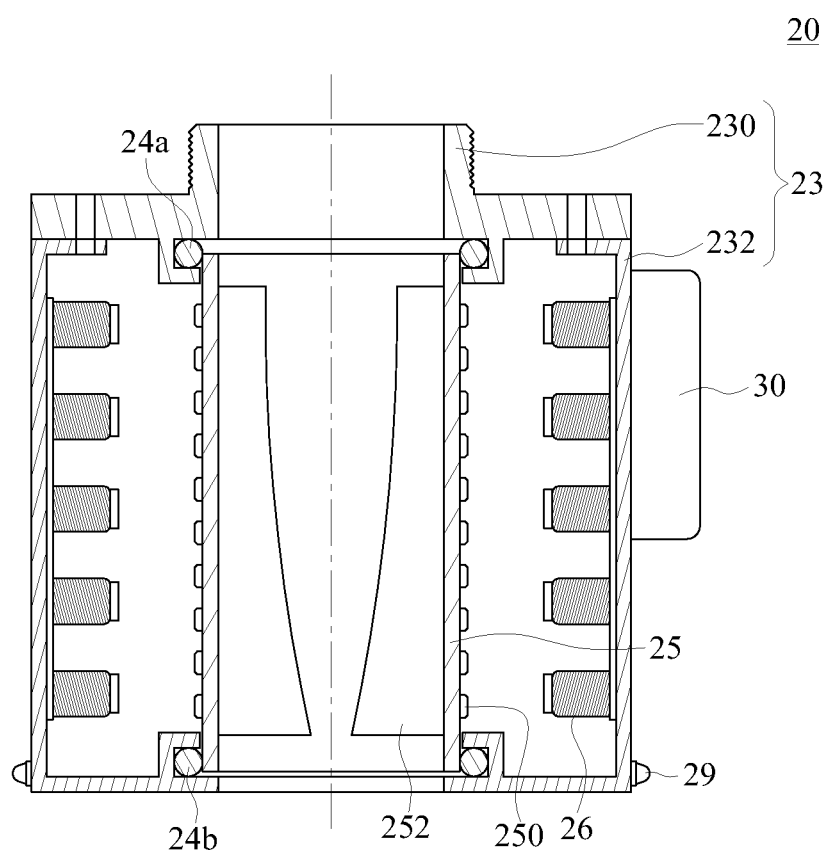
FIG. 2 is a schematic cross-sectional view of the abnormal discharge alarm device for the steam trap according to the first embodiment of the present invention.
Figure 3:
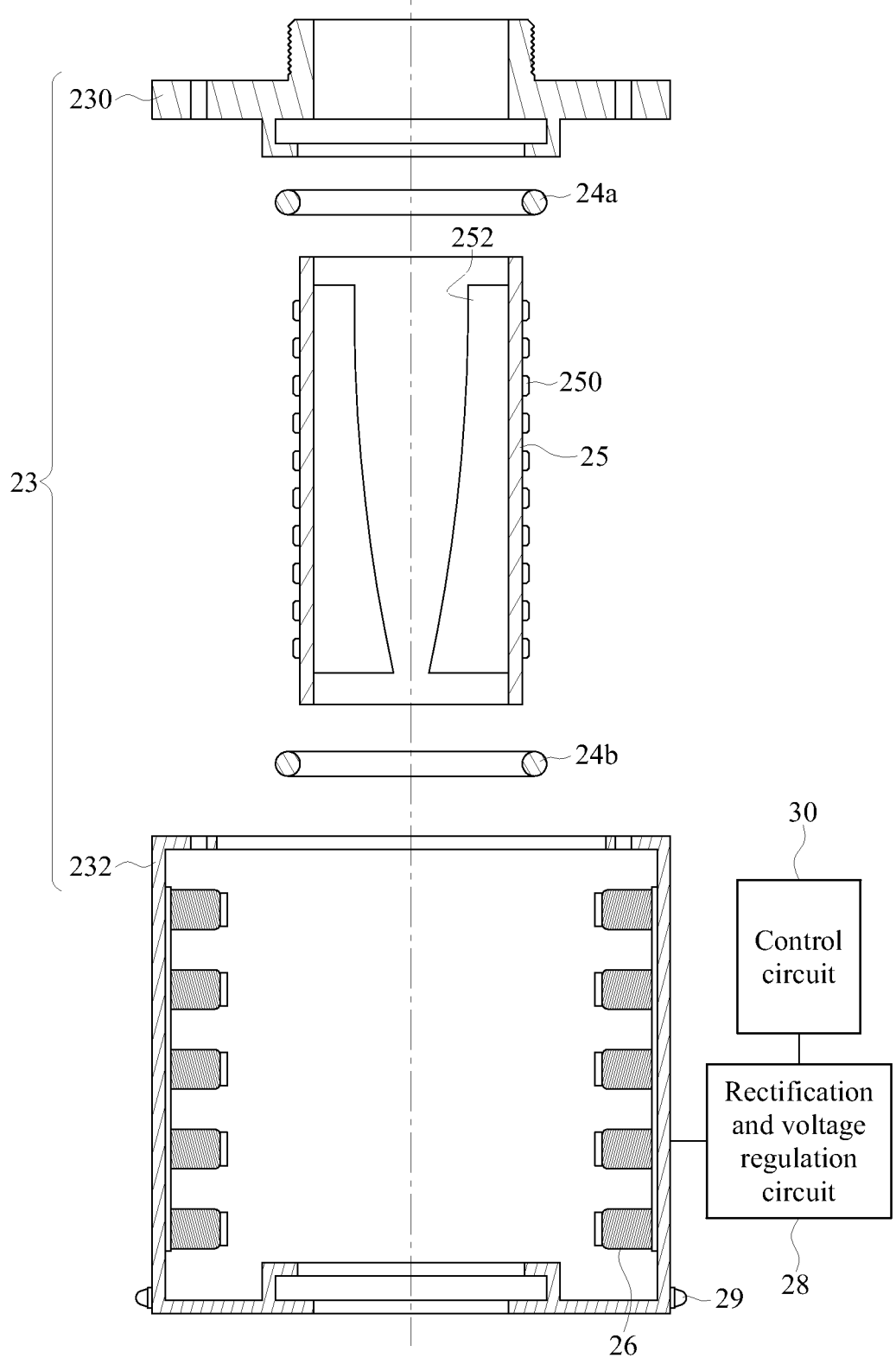
FIG. 3 is a schematic exploded cross-sectional view of the abnormal discharge alarm device for the steam trap according to the first embodiment of the present invention.

Next, reference is made to FIGS. 2 and 3. FIG. 2 is a schematic cross-sectional view of the abnormal discharge alarm device for the steam trap according to the first embodiment of the present invention, and FIG. 3 is a schematic exploded cross-sectional view of the abnormal discharge alarm device for the steam trap according to the first embodiment of the present invention.

The abnormal discharge alarm device 20 comprises a power generation component (the detailed structure will be illustrated below) and a control circuit 30. The power generation component is connected to the discharge port 96 through a connecting portion 230 and receives the fluid from the discharge port 96. When receiving the fluid, the power generation component generates a self-generated electric power.

The control circuit 30 has a predetermined threshold value. The control circuit 30 receives and detects the self-generated electric power to obtain a detection result. When the detection result exceeds the predetermined threshold value, the control circuit sends an alarm signal. The predetermined threshold value, the detection result, and the alarm signal will be illustrated below. The predetermined threshold value may be stored in any memory in the control circuit 30. The memory may be a built-in memory in a controller or an external memory, for example, but not limited to, an electrically-erasable programmable read-only memory (EEPROM).

The power generation component comprises a base body 232, a rotor 25, and a rectification and voltage regulation circuit 28. The base body 232 is connected to the connecting portion 230 to form a housing 23. The base body 232 is arranged with a plurality of induction coils 26. Therefore, a combination of the base body 232 and the induction coils 26 may also be referred to as a stator.

Figure 4:
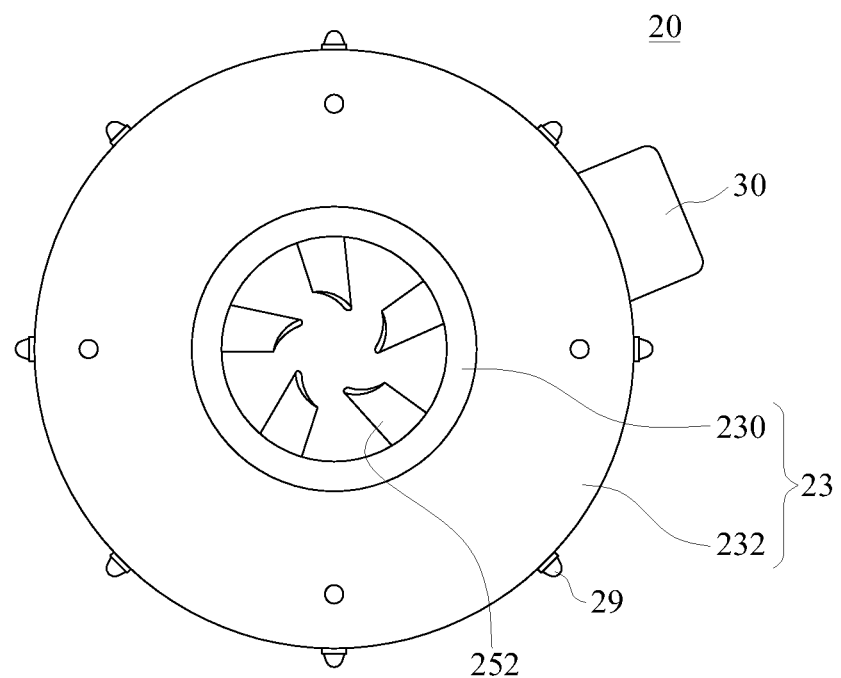
FIG. 4 is a schematic top view of the abnormal discharge alarm device for the steam trap according to the first embodiment of the present invention.

The rotor 25 is pivoted to the housing 23 through bearings 24a and 24b. The rotor 25 receives the fluid from the discharge port 96 and rotates as driven by the fluid. That is to say, no matter whether the discharge port 96 is in normal operation or abnormal operation, the rotor 25 can be driven to rotate as long as the fluid flows out. The rotor 25 has magnetic elements 250 and blades 252. The blades 252 are annularly arranged at an inner side of a hollow cylindrical wall of the rotor 25. Such an arrangement mode can be seen from FIG. 4. The blades 252 of the rotor 25 may be, but not limited to, of an axial flow type, a centrifugal type, a solid shaft type or a hollow shaft type. The magnetic elements 250 may be, but not limited to, permanent magnets.

Figure 5:
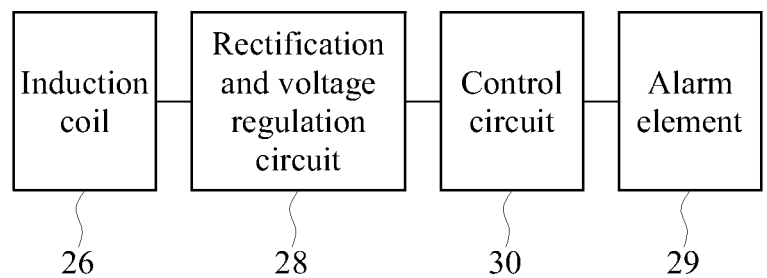
FIG. 5 is a schematic circuit block diagram of the abnormal discharge alarm device for the steam trap according to the first embodiment of the present invention.

FIG. 5 is a schematic circuit block diagram of the abnormal discharge alarm device for the steam trap according to the first embodiment of the present invention. After the rotor 25 rotates, magnetic fields of the magnetic elements 250 are cut by the induction coils 26. The induction coils 26 generate an induced electric power after cutting magnetic lines of force of the magnetic fields. The rectification and voltage regulation circuit 28 receives the induced electric power and performs rectification and voltage regulation on the induced electric power, so as to output the self-generated electric power. The rectification and voltage regulation circuit 28 may be, but not limited to, a combination of a bridge rectifier circuit and a zener diode.

After the self-generated electric power is generated, the self-generated electric power is output to the control circuit 30. The control circuit 30 may be a circuit without any external power supply. Therefore, after the self-generated electric power is generated, the control circuit 30 can start operating. The abnormal discharge alarm device 20 may further comprise an alarm element 29. The alarm element 29 may be an indicator lamp or an alarm lamp. If the alarm element 29 is an indicator lamp (or referred to as a discharge indicator lamp), the indicator lamp can emit a light ray upon reception of the self-generated electric power, so as to notify a maintainer or an operator that the steam trap 90 is discharging a fluid. If the alarm element 29 is an alarm lamp, the alarm lamp does not emit a light ray until reception of the self-generated electric power and the alarm signal, so that when the maintainer or operator sees the light ray emitted by the alarm lamp, it indicates that an abnormal discharge occurs. In addition, the alarm element 29 may also be an alarm, and the alarm emits a sound after receiving the self-generated electric power and the alarm signal, so that the maintainer or operator knows that an abnormal discharge occurs.

Before illustrating setting of the predetermined threshold value, operating modes (comprising a failure state) of the steam trap 90 are illustrated through experiments and experience. The operating modes of the steam trap 90 are approximately divided as follows: Mode One, intermittent steam or condensate water discharge; Mode Two, complete blockage; and Mode Three, continuous steam discharge. In Mode One, the discharge duration of steam or condensate water is related to the installation position of the steam trap 90 and the characteristics of the steam system, and the discharge duration may be shorter than 1 second or up to several seconds. Mode Two and Mode Three are failure states. In Mode Two, no discharge occurs for a long time, and in Mode Three, a discharge occurs for a long time. The duration of the continuous non-discharge or discharge is also related to the installation position of the steam trap 90 and the characteristics of the steam system.

Generally, a plurality of steam traps 90 is disposed in the steam system. Each steam trap 90 is individually disposed at different positions in the pipeline of the steam system. Through experience, discharge operations of steam traps 90 disposed at the same position are the same. That is to say, when the same steam trap 90 is disposed in the pipeline, the steam trap 90 generally performs a discharge in Mode One during normal operation. If the discharge mode of the same steam trap 90 is changed after the same steam trap 90 is used for a period of time, a failure might occur to the steam trap 90. Therefore, after the steam trap 90 is installed, an intermittent frequency, a duration of each discharge, and a closing duration (non-discharge) after each discharge during normal operation of the steam trap 90 can be known through observation. Then, according to an observation result, an average value of the durations of the discharges is set as the predetermined threshold value.

The power generation component of the abnormal discharge alarm device 20 generates the self-generated electric power when a discharge occurs at the discharge port 96 of the steam trap 90. The self-generated electric power is supplied to the control circuit 30 and starts the control circuit 30, so that the control circuit 30 performs duration calculation. When a continuous discharge duration calculated by the control circuit 30 is greater than the predetermined threshold value, an alarm signal is sent. In such a manner, the objective of abnormal alarming is achieved.

The predetermined threshold value may also be a sum of an average value plus a triple standard deviation obtained by analyzing statistics regarding durations of a certain number of discharges, or a value obtained by other statistical methods. For example, the predetermined threshold value is, but not limited to, an upper limit at a confidence level of 95%. The predetermined threshold value may further be a range (that is, the control circuit 30 has two threshold values), for example, a range between an average value plus and minus a triple standard deviation obtained by analyzing statistics regarding durations of a certain number of discharges. In such a manner, when the detection result of the control circuit 30 (current discharge duration) exceeds the predetermined threshold value (range), the control circuit 30 sends an alarm signal. That is, if the current discharge duration is shorter than the a lower limit of the predetermined threshold value or longer than an upper limit of the predetermined threshold value, it indicates that the discharge of the steam trap 90 is already different from the normal operating state and the maintainer has to repair the steam trap 90.

Since the electric power of the control circuit 30 is from the self-generated electric power, if the discharge duration is shorter than the predetermined threshold value, the control circuit 30 fails to send the alarm signal, as no self-generated electric power exists. Therefore, an energy storage capacitor may be arranged in the control circuit 30 or the rectification and voltage regulation circuit 28. The energy storage capacitor can store the electric power when the self-generated electric power exists and supply the electric power to enable the control circuit 30 to send the alarm signal when the self-generated electric power no longer exists.

Besides serving as a drive source or a reference signal for the alarm element 29, the alarm signal may also drive a wired or wireless transmission module, so that the wired or wireless transmission module transmits the alarm signal to a remote central console (for example, a monitoring unit) for subsequent processing. Embodiments related to this part will be illustrated in detail below.

Moreover, the detection result detected by the control circuit 30 may not only be the current discharge duration, but may also be, but not limited to, a voltage value or a current value of the self-generated electric power. A magnitude of the voltage value or current value of the self-generated electric power is related to a flow quantity and a flow velocity of the fluid discharged from the discharge port 96. Therefore, likewise, after the steam trap 90 is installed in the pipeline of the steam system, the voltage value or current value during normal operation of the steam trap 90 is continuously observed, and a threshold value allowing normal operation is obtained by a statistical method and used as the predetermined threshold value.

Figure 6:
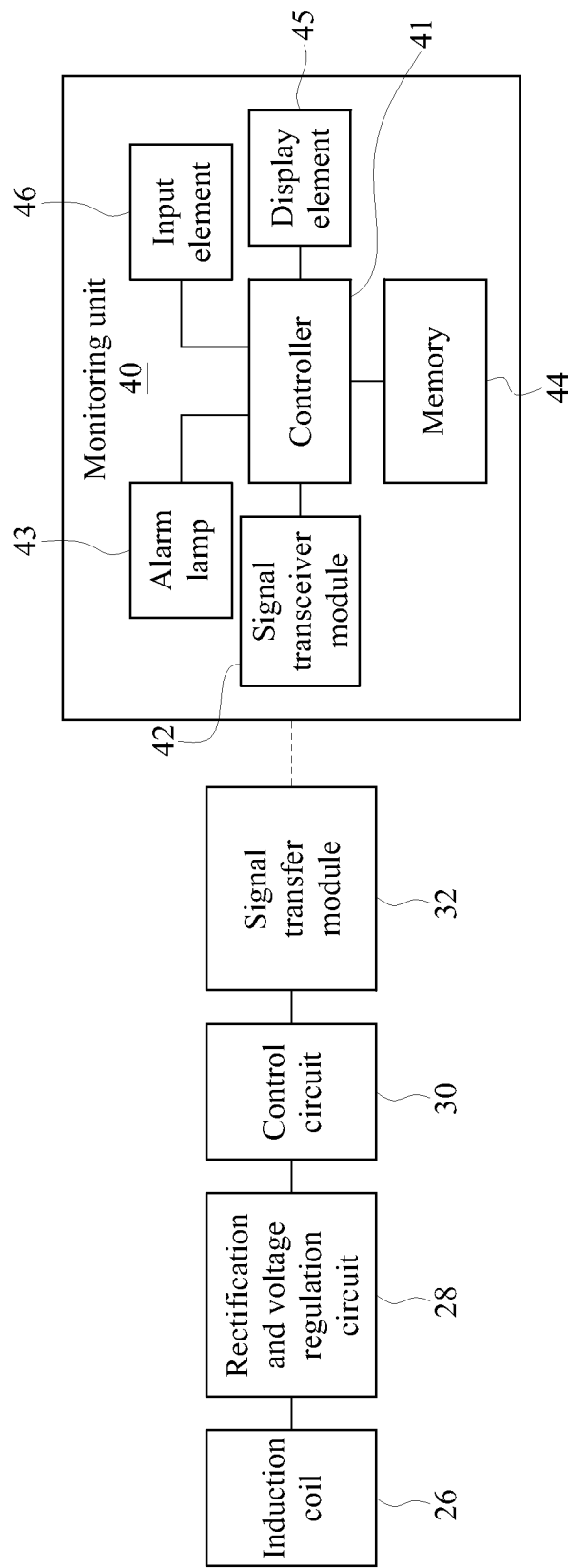
FIG. 6 is a schematic circuit block diagram of an abnormal discharge alarm device for a steam trap according to a second embodiment of the present invention.

FIG. 6 is a schematic circuit block diagram of an abnormal discharge alarm device for a steam trap according to a second embodiment of the present invention. As can be seen from FIG. 6, the abnormal discharge alarm device 20 further comprises a signal transfer module 32 and a monitoring unit 40. The monitoring unit 40 is electrically coupled to the signal transfer module 32.

The signal transfer module 32 is electrically coupled to the control circuit 30. The signal transfer module 32 receives and transmits the alarm signal. The monitoring unit 40 receives the alarm signal transmitted by the signal transfer module 32 and sends an alarm corresponding to the alarm signal. Normally, an external electric power is supplied to the monitoring unit 40, so that the monitoring unit 40 can continuously send an alarm upon reception of the alarm signal until the maintainer confirms the alarm. A mode of the alarm sent by the monitoring unit 40 may be, but not limited to, lamp light display, screen display, short message sending or acoustic alarm sending.

The signal transfer module 32 may be, but not limited to, a wired transmission module or a wireless transmission module. The wireless transmission module may be, but not limited to, a Bluetooth communication element, a wireless network communication element (for example, Zigbee), a general packet radio service (GPRS) communication element, a personal handyphone system (PHS) communication element, a code division multiple access (CDMA) communication element, a wideband CDMA (WCDMA) communication element or a global system for mobile communications (GSM) communication element.

As shown in FIG. 6, the monitoring unit 40 comprises a controller 41, a signal transceiver module 42, and an alarm lamp 43. The signal transceiver module 42 receives the alarm signal transmitted from the signal transfer module 32 and provides the alarm signal to the controller 41. After receiving the alarm signal, the controller 41 actuates the alarm lamp 43 to emit a light ray, so as to alarm a maintainer, thereby achieving an effect of remote alarming.

In addition, the monitoring unit 40 may further comprise a memory 44, a display element 45, and an input element 46. The memory 44 may be, but not limited to, a random access memory (RAM) or an EEPROM. The display element 45 may be, but not limited to, a liquid crystal display (LCD) unit, a seven segment display, or a light emitting diode (LED) display panel. The input element 46 may be a keyboard or buttons for a user to operate the monitoring unit 40.

The controller 41 may store the received alarm signal in the memory 44 or display the alarm signal on the display element 45. The user (for example, the maintainer) may query all records of the alarm signal by using the input element 46 and the display element 45.

Moreover, the control circuit 30 can transmit the detection result to the monitoring unit 40 through the signal transfer module 32. The monitoring unit 40 collects and analyzes statistics regarding the detection result to obtain an updated threshold value. Then, the monitoring unit 40 can transmit the updated threshold value to the control circuit 30 through the signal transfer module 32. The control circuit 30 replaces the predetermined threshold value with the received updated threshold value. In such a manner, the predetermined threshold value of the control circuit 30 can be set by a statistical method of the monitoring unit 40, and relatively precise abnormal monitoring can be achieved.

According to this embodiment, the operation of the abnormal discharge alarm device 20 may be divided into two modes, namely, a learning mode and a monitoring mode. When the abnormal discharge alarm device 20 and the steam trap 90 are initially installed in the steam system and operate normally, the abnormal discharge alarm device 20 is generally set to the learning mode. At this time, the monitoring unit 40 of the abnormal discharge alarm device 20 collects the detection result transmitted from the control circuit 30. The detection result may be, but not limited to, a discharge duration, a duration of each discharge, a voltage value in a discharge interval, or a current value in the discharge interval.

The controller 41 receives the detection result, and stores the detection result in the memory 44 or displays the detection result on the display element 45. Subsequently, after a certain period of time or when the user switches the abnormal discharge alarm device 20 to the monitoring mode, the controller 41 analyzes statistics regarding all the collected detection results to obtain a threshold value. At this time, the threshold value obtained by the controller 41 may be threshold values of different physical quantities, for example, but not limited to, a discharge duration range (an upper limit and a lower limit), an intermittent frequency range of discharge, a discharge voltage range, a discharge current range, or an upper limit of non-discharge duration. The intermittent frequency range means the number of times of discharges from the same steam trap 90 per unit time (per hour or day) after statistics is analyzed for a period of time. The intermittent frequency value may also be replaced by a period, for example, in a normal state, an upper limit and a lower limit value (a range) of a duration of each discharge and stop (non-discharge). The discharge duration range means a range (comprising upper and lower limits) of a normal duration of each continuous discharge from the steam trap 90, which is statistically obtained during normal discharge. For the upper limit of non-discharge duration, during normal operation of the steam trap 90, if the non-discharge duration exceeds the upper limit, it indicates that blockage might occur to the steam trap 90.

When analyzing statistics regarding the detection result to obtain the threshold value, the controller 41 may also perform outlier removal and clustering processing on all the collected data first, so as to obtain a more precise threshold value. In addition, in order to prevent the abnormal discharge alarm device 20 from sending the abnormal signal inappropriately, the controller 41 may also add a safety coefficient to the statistically obtained threshold value.

After the abnormal discharge alarm device 20 is switched from the learning mode to the monitoring mode, the controller 41 obtains the various threshold values and continuously receives real-time discharge information (that is, the detection result) of the steam trap 90 transmitted by the control circuit 30. When receiving the detection result, the controller 41 compares the detection result with the threshold value. When the detection result exceeds (greater than or smaller than) the threshold value, the controller 41 sends an alarm. That is to say, when the monitoring unit 40 is set to the monitoring mode, the monitoring unit 40 obtains an intermittent frequency value according to the collected detection result, and when the intermittent frequency value does not fall within the intermittent frequency range, the monitoring unit 40 sends an intermittent abnormal signal. When the monitoring unit 40 obtains a discharge duration (duration of a single real-time continuous discharge) according to the collected detection result and the discharge duration does not fall within the discharge duration range, the monitoring unit 40 sends a discharge abnormal signal. When the monitoring unit 40 obtains a non-discharge duration according to the collected detection result and the non-discharge duration exceeds the upper limit of non-discharge duration, the monitoring unit 40 sends a non-discharge abnormal signal.

When the abnormal discharge alarm device 20 according to the second embodiment in FIG. 6 is applied, whether an anomaly occurs can be determined by the controller 41. In such a manner, the types of anomalies that can be determined can be extended to detailed physical characteristics of the various detection results, such as voltage and current. It may even be determined whether the steam trap 90 is blocked and stops operating for a long time. In such a manner, the abnormal discharge alarm device 20 can achieve the objective of monitoring the three different operating modes of the steam trap 90.

Figure 7:
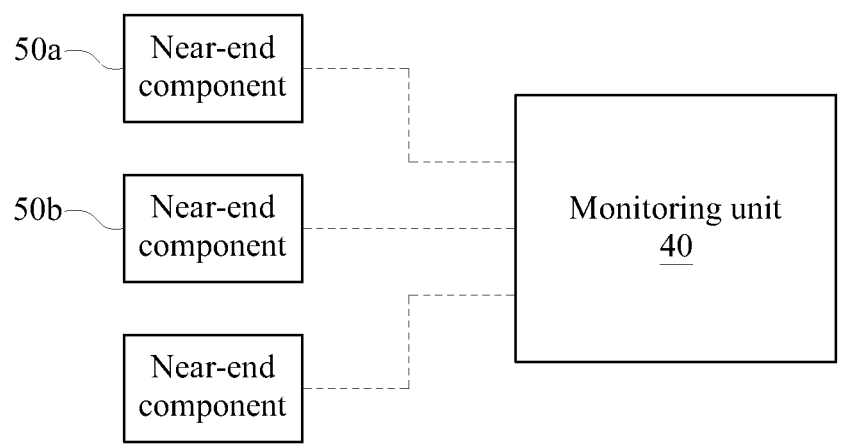
FIG. 7 is a schematic circuit block diagram of an abnormal discharge alarm device for a steam trap according to a third embodiment of the present invention.

FIG. 7 is a schematic circuit block diagram of an abnormal discharge alarm device for a steam trap according to a third embodiment of the present invention. In the third embodiment, the abnormal discharge alarm device comprises a plurality of near-end components 50a and 50b and a monitoring unit 40. Each of the near-end components 50a and 50b may comprise the power generation component, the control circuit 26, and the signal transfer module 32. The monitoring unit 40 may comprise the controller 41, the signal transceiver module 42, the memory 44, the alarm lamp 43, the display element 45, and the input element 46.

Each of the near-end components 50a and 50b is arranged at a steam trap 90, so as to collect a detection result for each discharge from the steam trap 90. The control circuit 30 of each of the near-end components 50a and 50b transmits the collected detection result to the monitoring unit 40 through the signal transfer module 32 in real time, and at the same time transmits an identifier (that is, a number) of the near-end component 50a or 50b to the monitoring unit 40. The monitoring unit 40 collects the detection results of the steam traps 90 into different categories according to the identifiers of the near-end components 50a and 50b. If the user (or maintainer) controls the monitoring unit 40 to calculate the threshold value or switch the abnormal discharge alarm device 20 from the learning mode to the monitoring mode, the controller 41 analyzes statistics regarding and obtains corresponding threshold values according to the identifiers of the near-end components 50a and 50b, respectively. That is to say, in this embodiment, each of the near-end components 50a and 50b has a corresponding threshold value, and each of the near-end components 50a and 50b may have a plurality of threshold values, so as to monitor whether a real-time discharge of the corresponding steam trap 90 is normal.

As can be seen from above, different functions can be realized in different embodiments of the abnormal discharge alarm device 20. The abnormal discharge alarm device 20 can generate a self-generated electric power by using the fluid discharged by the steam trap 90 and supply the self-generated electric power to the control circuit 30 for use, so that control circuit 30 can send an abnormal signal when determining that an anomaly occurs. In the second embodiment, by additionally providing the monitoring unit 40, a plurality of abnormal states of the steam trap 90 can be monitored and the predetermined threshold value can be updated according to a normal operating state of the specific steam trap 90, so that the control circuit 30 can send an alarm signal more accurately. In the third embodiment, a single monitoring unit 40 is provided corresponding to a plurality of near-end components 50a and 50b, and is used to monitor the steam traps 90 corresponding to the near-end components 50a and 50b, thereby achieving effects of energy saving and abnormal alarming.

What is claimed is:

1. An abnormal discharge alarm device for a steam trap, applied in a steam trap having a discharge port for discharging a fluid, the abnormal discharge alarm device comprising:
   a power generation component, comprising:
      a housing, connected to the discharge port and having a plurality of induction coils;
      a rotor, pivoted to the housing, rotating by receiving the fluid from the discharge port, and further having a plurality of magnetic elements, wherein the induction coils cut magnetic lines of force of the magnetic elements to generate an induced electric power when the rotor rotates; and
      a rectification and voltage regulation circuit, for performing rectification and voltage regulation on the induced electric power to obtain a self-generated electric power; and
   a control circuit, having a predetermined threshold value, the control circuit receiving and detecting the self-generated electric power to obtain a detection result, and sending an alarm signal when the detection result exceeds the predetermined threshold value.

2. The abnormal discharge alarm device according to claim 1, further comprising an alarm lamp, for receiving the self-generated electric power, and emitting a light ray when receiving the alarm signal.

3. The abnormal discharge alarm device according to claim 1, further comprising:
   a signal transfer module, for receiving and transmitting the alarm signal; and
   a monitoring unit, for receiving the alarm signal transmitted by the signal transfer module, and sending an alarm corresponding to the alarm signal.

4. The abnormal discharge alarm device according to claim 3, wherein the control circuit transmits the detection result to the monitoring unit through the signal transfer module, the monitoring unit collects and analyzes statistics regarding the detection result to obtain an updated threshold value, the monitoring unit transmits the updated threshold value to the control circuit through the signal transfer module, and the control circuit replaces the predetermined threshold value with the received updated threshold value.

5. The abnormal discharge alarm device according to claim 4, wherein the control circuit further has an identifier, and the control circuit transmits the identifier to the monitoring unit together when transmitting the detection result or sending the alarm signal.

6. The abnormal discharge alarm device according to claim 3, wherein the monitoring unit has a learning mode and a monitoring mode, when the monitoring unit is set to the learning mode, the monitoring unit obtains an intermittent frequency range according to the collected detection result, when the monitoring unit is set to the monitoring mode, the monitoring unit obtains an intermittent frequency value according to the collected detection result, and when the intermittent frequency value does not fall within the intermittent frequency range, the monitoring unit sends an intermittent abnormal signal.

7. The abnormal discharge alarm device according to claim 6, wherein when the monitoring unit is set to the learning mode, the monitoring unit obtains a discharge duration range according to the collected detection result, when the monitoring unit is set to the monitoring mode, the monitoring unit obtains a discharge duration according to the collected detection result, and when the discharge duration does not fall within the discharge duration range, the monitoring unit sends a discharge abnormal signal.

8. The abnormal discharge alarm device according to claim 7, wherein when the monitoring unit is set to the learning mode, the monitoring unit obtains an upper limit of non-discharge duration according to the collected detection result, when the monitoring unit is set to the monitoring mode, the monitoring unit obtains a non-discharge duration according to the collected detection result, and when the non-discharge duration exceeds the upper limit of non-discharge duration, the monitoring unit sends a non-discharge abnormal signal.

* * * * *